US012591232B2

(12) United States Patent
de Groot

(10) Patent No.: US 12,591,232 B2
(45) Date of Patent: Mar. 31, 2026

(54) METHOD FOR CAPTURING RESULTS OF AN EVALUATION, DIAGNOSIS AND/OR CHECK OF AT LEAST ONE DEVICE FUNCTIONALITY OF A FIELD DEVICE

(71) Applicant: Endress+Hauser Process Solutions AG, Reinach (CH)

(72) Inventor: Vincent de Groot, St. Louis (FR)

(73) Assignee: Endress+Hauser Process Solutions AG, Reinach (CH)

(*) Notice: Subject to any disclaimer, the term of this patent is extended or adjusted under 35 U.S.C. 154(b) by 0 days.

(21) Appl. No.: 18/693,006

(22) PCT Filed: Sep. 7, 2022

(86) PCT No.: PCT/EP2022/074892

§ 371 (c)(1),
(2) Date: Mar. 18, 2024

(87) PCT Pub. No.: WO2023/041400

PCT Pub. Date: Mar. 23, 2023

(65) Prior Publication Data

US 2024/0393780 A1 Nov. 28, 2024

(30) Foreign Application Priority Data

Sep. 20, 2021 (DE) ..................... 10 2021 124 249.5

(51) Int. Cl.
*G05B 23/02* (2006.01)
*G06V 30/148* (2022.01)

(52) U.S. Cl.
CPC ....... *G05B 23/0272* (2013.01); *G06V 30/153* (2022.01)

(58) Field of Classification Search
CPC ...... G05B 23/0272; G05B 2219/23363; G05B 2219/25428; G05B 19/042; G05B 19/0423; G05B 19/4183; G06V 30/153
See application file for complete search history.

(56) References Cited

U.S. PATENT DOCUMENTS 7,296,221 B1 * 11/2007 Treibach-Heck .... G06Q 20/203
715/224
7,715,035 B2 * 5/2010 Lapstun ................. B41J 13/103
358/1.15

(Continued)

FOREIGN PATENT DOCUMENTS

DE 102016107045 A1 10/2017
DE 102016124146 A1 6/2018

(Continued)

*Primary Examiner* — Adnan Aziz
(74) *Attorney, Agent, or Firm* — Kelly J. Smith; Endress+Hauser (USA) Holding, Inc.

(57) ABSTRACT

The present disclosure relates to a method for capturing results of an evaluation, diagnosis and/or check of a device functionality of a field device. As part of the evaluation or check, the field device a raw data set of report parameters containing the result of the evaluation, diagnosis or check. The method includes producing a physical report comprising a graphical code having coded information, the coded information including at least a device identification of the field device and the date of the report, and the physical report-being signed with a signature. The method also includes capturing the graphical code and the signature on the signed report using an optical capturing unit, decoding the coded information from the captured graphical code, producing a machine-readable report and/or a report in a publishable file format containing the decoded information, and transmitting the machine-readable report in the publishable format to a server.

12 Claims, 1 Drawing Sheet

(56)          References Cited

U.S. PATENT DOCUMENTS

| | | | | |
|---|---|---|---|---|
| 11,650,217 | B2 * | 5/2023 | Ono | G01N 35/00 |
| | | | | 702/189 |
| 2003/0014515 | A1 * | 1/2003 | Motoyama | H04L 67/535 |
| | | | | 709/224 |
| 2005/0060179 | A1 * | 3/2005 | Tinberg | G06Q 30/0278 |
| | | | | 705/306 |
| 2006/0244565 | A1 * | 11/2006 | Friedrich | G06K 7/10881 |
| | | | | 340/572.1 |
| 2012/0323796 | A1 * | 12/2012 | Udani | G16H 10/20 |
| | | | | 705/80 |
| 2015/0046125 | A1 * | 2/2015 | Jagiella | G01M 99/008 |
| | | | | 702/184 |
| 2019/0332388 | A1 * | 10/2019 | Schmidt | G06K 7/1417 |
| 2020/0012634 | A1 * | 1/2020 | Eberhardt | G01M 99/00 |
| 2021/0281421 | A1 * | 9/2021 | Semenovskiy | G06Q 20/3276 |

FOREIGN PATENT DOCUMENTS

| | | | | | |
|---|---|---|---|---|---|
| DE | 102019216393 | A1 | | 4/2021 | |
| DE | 102019134895 | A1 * | 6/2021 | | G05B 19/0423 |
| WO | 2015152697 | A1 | | 10/2015 | |

* cited by examiner

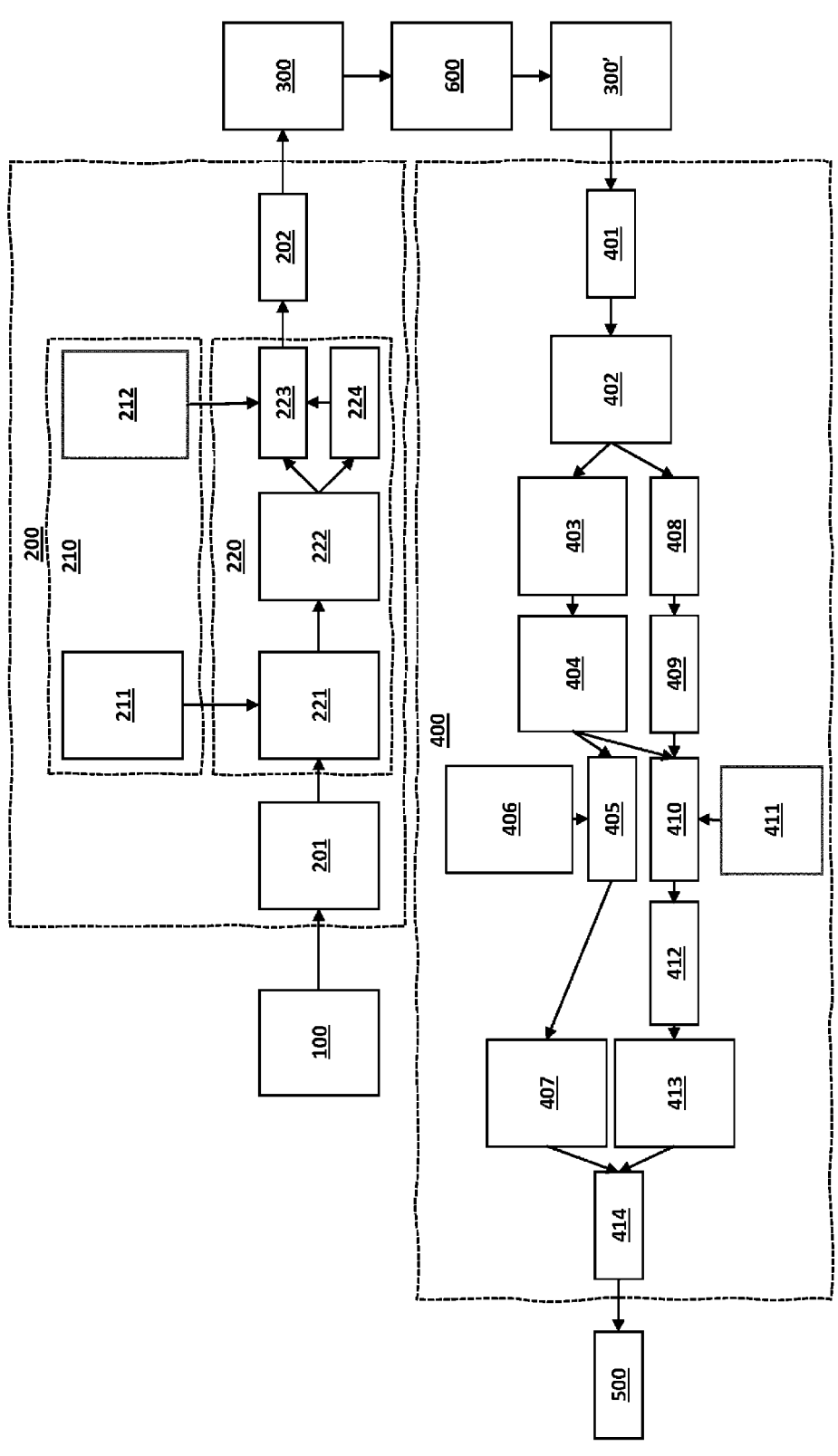

METHOD FOR CAPTURING RESULTS OF AN EVALUATION, DIAGNOSIS AND/OR CHECK OF AT LEAST ONE DEVICE FUNCTIONALITY OF A FIELD DEVICE

CROSS-REFERENCE TO RELATED APPLICATIONS

The present application is related to and claims the priority benefit of DPMA Patent Application No. 10 2021 124 249.5, filed on Sep. 20, 2021, and International Patent Application No. PCT/EP2022/074892, filed Sep. 7, 2022, the entire contents of which are incorporated herein by reference.

TECHNICAL FIELD

The invention relates to a method for capturing results of an evaluation, diagnosis and/or check of at least one device functionality of a field device, wherein, as part of the evaluation or check, the field device generates at least one raw data set of report parameters containing the result of the evaluation or diagnosis or check.

BACKGROUND

Field devices that are used in industrial installations are already known from the prior art. Field devices are often used in process automation engineering, as well as in manufacturing automation engineering. In principle, all devices which are process-oriented and which supply or process process-relevant information are referred to as field devices. Field devices are thus used for detecting and/or influencing process variables. Measuring devices, or sensors, are used for detecting process variables. These are used, for example, for pressure and temperature measurement, conductivity measurement, flow measurement, pH measurement, fill level measurement etc., and detect the corresponding process variables of pressure, temperature, conductivity, pH value, fill level, flow etc. Actuators are used for influencing process variables. These are, for example, pumps or valves that can influence the flow of a fluid in a pipe or the fill level in a tank. In addition to the aforementioned measuring devices and actuators, field devices are also understood to include remote I/Os, radio adapters, or, generally, devices that are arranged at the field level.

A number of such field devices are produced and marketed by the Endress+Hauser group.

In modern industrial plants, field devices are usually connected to superordinate units via communication networks such as fieldbuses (Profibus®, Foundation® Fieldbus, HART® etc.). Usually, the superordinate units are control systems (DCS) or control units, such as an SPC (stored program control). The superordinate units are used for, among other things, process control, process visualization, and process monitoring, as well as commissioning of the field devices. The measured values recorded by the field devices, especially by sensors, are transmitted via the respective bus system to a (or in some cases a plurality of) superordinate unit(s). In addition, data transmission from the superordinate unit via the bus system to the field devices is also required, especially for configuration and parameterization of field devices and for controlling actuators.

Mobile operating devices are often also used for operating (for example parameterizing or retrieving data from) the field devices. Such mobile operating devices are connected to a field device via wires (for example via a service interface) or wirelessly (for example via Bluetooth). For example, laptops, mobile terminals such as smartphones or tablets, or a central asset management station are used as operating devices.

For operating the field devices, corresponding operating programs (operating tools) are necessary which either run independently on the superordinate units or in the mobile operating devices (Endress+Hauser FieldCare, PACTware, AMS Fisher-Rosemount, PDM Siemens) or are integrated in applications of the control station (Siemens PCS7, ABB Symphony, Emerson Delta V). The term "operate" means, inter alia, parameterizing the field device, updating the field device and/or requesting and visualizing process data and/or diagnostic data of the field device.

Field devices are integrated into such operating programs via device drivers or via device descriptions. They are provided by the device manufacturers so that the superordinate units, or the operating programs running on these superordinate units, can recognize and interpret the meaning of the information supplied by the field devices. Such an operating program in which the device descriptions or device drivers are loaded is also referred to as a frame application.

For complete operation of the field devices, special device drivers, so-called DTMs (device type managers), which correspond to the FDT (field device tool) specifications, are available. Many field device manufacturers supply corresponding DTMs for their field devices. The DTMs encapsulate all variables and functions of the corresponding field device and usually offer a graphical user interface for operating the devices within the frame application.

The device drivers offer the possibility of evaluating, diagnosing and/or checking certain device functionalities. Many modern field devices permit, for example, a self-test, for example as part of the "heartbeat" (a self-test functionality implemented in the applicant's field devices) or SIL functionality. The result of this self-test, evaluation, etc. is output in a report by the device driver. Said report receives the relevant report parameters, i.e., test results, device status, etc. The report is, more particularly, sent directly to a printer and printed out in physical form. The report is processed, for example, by the service personnel who carry out a visual inspection of, and subsequently sign, the report. Once signed, the report is scanned or physically stored.

Since the reports often include several pages, scanning is associated with great manual effort, which is susceptible to errors (poor quality of the scan, accidental omission of individual pages, etc.). Moreover, the scanned reports are not machine-readable and mainly include image elements.

Given this problem, the invention is based on the object of simplifying the manageability and long-term storage of such reports.

SUMMARY

This object is achieved by a method for capturing results of an evaluation, diagnosis and/or check of at least one device functionality of a field device, wherein, as part of the evaluation or diagnosis or check, the field device generates at least one raw data set of report parameters containing the result of the evaluation or diagnosis or check, the method comprising:

producing a physical report, the physical report comprising a graphical code having coded information, the coded information including at least a device identification of the field device and the date of the report, and the physical report being signed by at least one person with at least one signature;

capturing the graphical code and the at least one signature on the signed report by means of an optical capturing unit;

decoding the coded information from the captured graphical code;

producing a machine-readable report and/or a report in a publishable file format, more particularly in a PDF format, containing the decoded information, the report in the publishable file format containing the at least one captured signature; and transmitting the machine-readable report and/or the report in the publishable format to a server.

By means of the method according to the invention, reports are produced which are present in a machine-readable format, i.e., for example as code, or in a publishable file format, more particularly PDF or XPS. The manual effort for scanning the physical report, i.e., the report printed on paper, is reduced and possible error sources are reduced, since only the graphical code and the at least one signature need to be scanned.

The graphical code is, more particularly, a two-dimensional code, for example a QR code, a barcode or a similarly suitable graphical code.

It can be provided for the final machine-readable or publishable report to be produced only once a signature on the physical report has been scanned and recognized.

According to a first variant of the method according to the invention, it is provided for the coded information to comprise the raw data set of report parameters of the field device, wherein report data are generated by enriching the raw data set of report parameters extracted from the decoded graphical code with field device-specific information, wherein the machine-readable report contains the report data, or wherein the report in the publishable file format contains the report data. Further field device-specific information, for example service or maintenance information, measurement point information, application-specific information, etc., which are not present in the original report and may have to be added in a complicated manner, are thus added to the final machine-readable or publishable report.

According to a first variant of the method according to the invention, it is provided for an operating unit to read out the raw data set of report parameters from the field device, or wherein the operating unit instructs the field device to generate the raw data set of report parameters and to transmit it to the operating unit, wherein the operating unit generates the graphical code and instructs a printer to produce the physical report. The first operating unit is, for example, an operating unit within the meaning of the "Field Xpert" marketed by the applicant, or a laptop or an (industrial) tablet. Advantageously, a frame application, especially based on the FDT standard, is located on the first operating unit and hosts at least one device driver matching the field device, more particularly a DTM. The device driver has instructs the device to generate the raw data set of report parameters, for example by initiating a self-test, and continues processing, especially with the generation of the graphical code and instruction to the printer to produce the physical report.

According to a second variant of the method according to the invention, it is provided for the field device to generate the raw data set of report parameters, wherein the field device generates the graphical code and wherein the field device instructs a printer, for example via Ethernet, WLAN or Bluetooth, to produce the physical report. This process is initiated by a user, for example. It may also be provided for the field device to automatically start the process, for example in the presence of a certain process condition and/or at regular time intervals.

According to a first variant of the method according to the invention, it is provided for the field device to generate the raw data set of report parameters, wherein the field device generates the graphical code, wherein the field device has a display unit and displays the graphical code, wherein an operating unit captures the graphical code by means of an optical capturing unit, wherein the operating unit instructs a printer to produce the physical report. In the present case, the first operating unit is, more particularly, a mobile terminal, more particularly a smartphone or a tablet, on which an application (app) is installed, which is configured to accordingly instruct the printer to correspondingly produce the physical report on the basis of the raw data set contained in the graphical code.

An advantageous embodiment of the method according to the invention provides for the steps of capturing the graphical code and the at least one signature on the signed report, decoding the coded information from the captured graphical code, generating the report data, producing the machine-readable report and/or the report in the publishable file format, and transmitting said machine-readable report and/or report in the publishable file format to the server, to be carried out by means of an operating unit which comprises the optical capturing unit. In the present case, the second operating unit is, more particularly, a mobile terminal, more particularly a smartphone or a tablet, on which an application (app) is installed.

An alternative embodiment of the method according to the invention provides for a scanner or camera which comprise the optical capturing unit to capture the graphical code and the at least one signature on the signed report, wherein the captured optical code and the at least one captured signature are transferred to a server, and wherein the server carries out the steps of decoding the coded information from the captured graphical code, generating the report data and producing the machine-readable report and/or the report in the publishable file format.

According to an advantageous embodiment of the method according to the invention, it is provided for the person to add handwritten notes to the physical report, wherein the handwritten notes are also captured, similarly to the signature, and are featured in the machine-readable report or in the report in the publishable file format. It may be provided, more particularly, for the handwritten notes to be detected after being captured and to be also made machine-readable (OCR).

According to an advantageous embodiment of the method according to the invention, it is provided for the report parameters to be heartbeat parameters or SIL parameters which are generated in the course of a diagnostic test of the field device. However, they may also be further parameters of the field device, more particularly operation—or application-specific parameters, or further parameters which are generated by the field device in comparable evaluation, diagnostic, and/or checking methods.

According to an advantageous development of the method according to the invention, it is provided for the machine-readable report or the report in the publishable format to be repeatedly produced and transmitted to the server.

According to an advantageous embodiment of the method according to the invention, it is provided for the server to check the report data of the machine-readable reports for long-term changes and/or anomalies. For example, a slow drift of certain report parameters can be detected so that the system owner or field device owner is advised in time of preventive measures or (maintenance) measures that need to be carried out.

BRIEF DESCRIPTION OF THE DRAWING

The present disclosure will be explained in greater detail with reference to the following drawing. In the figure:

FIG. 1 shows a schematic of an embodiment of the method according to the present disclosure.

DETAILED DESCRIPTION

In FIG. 1, a distinction needs to be made between components (in rectangles) and method steps (arrows). The method begins at the field device 100.

In a first method step, report parameters of a field device 100 are queried by a first operating unit 200 or are transmitted from the field device 100 to the first operating unit 200. In the present case, the report parameters are generated by the field device 100 in the course of a heartbeat self-test and provide information about the quality of different functionalities of the field device 100. Examples of field devices have been described in detail in the introductory part of the description. The first operating unit 200 is an industrial tablet on which an (FDT) frame application is installed and runs. Both a specific device description (for example a DD) 210 and a device driver (for example a DTM) 220 are installed and integrated in the (FDT) frame application for the field device 100.

The first operating unit 200 is connected to the field device 100 via a fieldbus, for example HART, Foundation Fieldbus, Profibus PA; however, it is also possible to use an Ethernet-based fieldbus or a wireless fieldbus. In the present case, a fieldbus master 201, which is part of the first operating unit 200, queries the report parameters from the field device 100. The queried report parameters are read by a universal parameter reading component 221 of the device driver 220. In order to interpret and allocate the report parameters, said component accesses a device-specific parameter list 211 of the device description 210, classifies said report parameters and combines them to form a raw data set 222.

The raw data set 222 is supplied to a code generator 224 and to a report formatting unit 223, both of which are components of the device driver 220. The code generator 224 generates a graphical code, more particularly a QR code, which contains the raw data set 222, and transfers it to the report formatting unit 223. A print layout of the report is generated using a device-specific report layout 212 which is included in the device description 210. This print layout is transmitted to a printer driver 202 of the first operating unit 200. The printer driver 202 instructs an external printer to prepare a physical report 300 of the heartbeat self-diagnosis test of the field device 100.

The physical report 300, which, in addition to the printed report parameters on the first side, contains the graphical code, is checked by a service technician or similar operator 600, and is signed after it has been checked. If necessary, the physical report 200 is checked and also signed by further persons/operators. Optionally, handwritten notes are added to the physical report 300, especially in a region or field provided for this purpose.

The signed report 300' is subsequently scanned by a second operating unit 400. For this purpose, the second operating unit 400 has an optical capturing unit 401, more particularly a camera. In the present case, the second operating unit 400 is a smartphone on which an app is installed, for example the applicant's "Netilion Scanner" app. The app has the components described below and executes the method steps described below:

The optical capturing unit 401 captures a digital scan 402 of the cover page of the signed report 300', on which the graphical code and the at least one signature are located.

A code extraction unit 403 separates the graphical code from the scan 402 and decodes the raw data set 404 contained in the graphical code. The raw data set is then enriched with field device-specific information 406 to form report data 405. A machine-readable report 407 is then produced from said report data 405.

At the same time, a signature extraction unit 408 separates the at least one signature 409 in image format from the scan 408. The signature 309 together with the raw data set 404 is transmitted to a report formatting unit that generates report data 410 using a device-specific report layout 411. Said report data 412 are converted by means of a document generator into a report 413 which is present in a publishable format, more particularly a PDF or XPS.

Both types of reports 407, 413 are transmitted by an upload component 414 via a network, for example the Internet, to a server 500 that stores both reports 407, 413.

It may be provided for this method to be repeated several times with a time delay. As a result, the server 500 gradually accumulates a plurality of reports 407, 413 for the field device 100. An app running on the server 500 or on another device is configured to analyze at least the machine-readable reports 407 and to calculate, for example, a trend from one or more of the report parameters. As a result, for example, a slow drift of certain report parameters can be detected so that the system owner or field device owner is advised in time by the server 500 of preventive measures or (maintenance) measures that need to be carried out.

The method described can have a number of alternatives: For example, the field device 100 can be configured to generate the graphical code itself and to transmit it to the printer or to display it by means of a display unit. In the latter case, the graphical code is optically captured by the first or second operating unit 200, 400 the physical report 300 by means of the printer.

It may also be provided for the machine-readable report 407 or the report in the publishable file format to be produced not by the second operating unit 400, but by the server 500 or a further device. For this purpose, the signed report 300' is scanned by a scanner or camera. The scan 401 is then transmitted to the server 500 or to the further device.

The invention claimed is:

1. A method for capturing results of an evaluation, diagnosis and/or check of at least one device functionality of a field device, wherein, as part of the evaluation or diagnosis or check, the field device generates at least one raw data set of report parameters containing the result of the evaluation or diagnosis or check, the method comprising:

producing a physical report, wherein the physical report comprises a graphical code having coded information, wherein the graphical code encodes the raw data of report parameters of the field device identification of the field device and the date of the report, wherein the coded information includes at least a device identification of the field device and the date of the report, and wherein the physical report is signed by at least one person with at least one signature;

capturing the graphical code and the at least one signature on the signed report using an optical capturing unit;

decoding the coded information from the captured graphical code;

producing a machine-readable report and/or a report in a publishable file format containing the decoded information, wherein the report in the publishable file format contains the at least one captured signature; and transmitting the machine-readable report and/or the report in the publishable format to a server.

2. The method according to claim 1, wherein report data are generated by enriching the raw data set of report parameters extracted from the decoded graphical code with field device-specific information, wherein the machine-readable report contains the report data, or wherein the report in the publishable file format contains the report data.

3. The method according to claim 1, wherein a first operating unit reads out the raw data set of report parameters from the field device, or wherein the first operating unit instructs the field device to generate the raw data set of report parameters and to transmit it to the first operating unit, wherein the first operating unit generates the graphical code and instructs a printer to produce the physical report.

4. The method according to claim 1, wherein the field device generates the raw data set of report parameters, wherein the field device generates the graphical code, and wherein the field device instructs a printer to produce the physical report.

5. The method according to claim 1, wherein the field device generates the raw data set of report parameters, wherein the field device generates the graphical code, wherein the field device has a display unit and displays the graphical code, wherein a first operating unit captures the graphical code using an optical capturing unit, wherein the first operating unit instructs a printer to produce the physical report.

6. The method according to claim 1, wherein the steps of capturing the graphical code and the at least one signature on the signed report, decoding the coded information from the captured graphical code, generating the report data, producing the machine-readable report and/or the report in the publishable file format, and transmitting it to the server, are carried using a second operating unit which comprises the optical capturing unit.

7. The method according to claim 1, wherein the process of capturing the graphical code and the at least one signature on the signed report is carried out using a scanner or camera which comprise the optical capturing unit, wherein the captured optical code and the at least one captured signature are transferred to a server, and wherein the server carries out the steps of decoding the coded information from the captured graphical code, generating the report data and producing the machine-readable report and/or the report in the publishable file format.

8. The method according to claim 1, wherein the person adds handwritten notes to the physical report, wherein the handwritten notes are also captured using the optical capturing unit and are included in the machine-readable report or in the report in the publishable file format.

9. The method according to claim 8, wherein the handwritten notes are made machine-readable using an OCR process after being captured.

10. The method according to claim 1, wherein the report parameters are heartbeat parameters or SIL parameters which are generated in the course of a diagnostic test of the field device.

11. The method according to claim 1, wherein the machine-readable report or the report in the publishable format is repeatedly produced and transmitted to the server.

12. The method according to claim 11, wherein the server checks the report data of the machine-readable reports for long-term changes and/or anomalies.

\* \* \* \* \*